United States Patent [19]

Gauler

[11] Patent Number: 4,702,686
[45] Date of Patent: Oct. 27, 1987

[54] NOZZLE FOR A SYNTHETIC PLASTIC INJECTION MOLDING MACHINE

[75] Inventor: Kurt Gauler, Egelsbach, Fed. Rep. of Germany

[73] Assignee: Incoe Exp. Inc., Fed. Rep. of Germany

[21] Appl. No.: 754,295

[22] Filed: Jul. 12, 1985

[30] Foreign Application Priority Data

Jul. 12, 1984 [DE] Fed. Rep. of Germany ....... 3425660

[51] Int. Cl.⁴ .............................................. B29C 45/20
[52] U.S. Cl. ............................... 425/190; 264/328.12; 425/463; 425/568; 425/573
[58] Field of Search ................. 425/97, 185, 188, 549, 425/564, 568, 572, 573, 588

[56] References Cited

U.S. PATENT DOCUMENTS

| | | | |
|---|---|---|---|
| 2,500,401 | 3/1950 | Cossette | 425/549 |
| 3,762,849 | 10/1973 | Claes | 425/588 |
| 4,285,660 | 8/1981 | Mueller | 425/568 |

Primary Examiner—Jay H. Woo
Assistant Examiner—Timothy W. Heitbrink
Attorney, Agent, or Firm—Robert J. Koch

[57] ABSTRACT

Nozzle for synthetic plastic injection molding machines made up of a shaft including a flow channel for plastic material and equipped with a tip. The flow channel is divided so that the plastic flows in two partial channels prior to reaching the tip. The shaft is made of a tube segment. The forward frontal orifice of the tube segment has a small plate tapering into a point. The point protrudes past the shaft. The tube segment at its frontal orifice has both an internal and an external turned recess. The internal recess serves as a seat for the small plate. The external recess serves as a seat for a nozzle cap, which comprises the injector orifice of the nozzle and serves to hold the small plate in place. The small plate has a shoulder at the transition to the tapering area to serve as a contact surface for a corresponding shoulder formed in the nozzle cap.

2 Claims, 2 Drawing Figures

NOZZLE FOR A SYNTHETIC PLASTIC INJECTION MOLDING MACHINE

BACKGROUND OF THE INVENTION

1. Field of the Invention

The invention relates to a nozzle for injection molding machines for synthetic plastic materials. The nozzle comprises a shaft containing plastic material and is provided with a tip and a flow channel divided into at least two partial channels prior to reaching the tip.

2. Description of the Prior Art

In a known nozzle the shaft consists of a rod shape pointed as a whole and provided with an axial bore serving as the flow channel for the plastic material, said bore branching out prior to reaching the tip into two laterally angled bores.

The known nozzle has several important disadvantages. Its essential disadvantage consists of that the division of the flow channel into two branching and in particular laterally angled partial channels results in two changes in the direction of flow of the plastic material during the injection process, which in turn leads to permanent alterations of the material structure. After the recombination of the plastic mass the known memory characteristic of the material may be only partially reversed or not at all. The results of these permanent structural changes are lasting quality defects of the finished injection molded part, in particular in relation to mechanical strength. In addition, the known nozzle presents a critical disadvantage affecting its industrial use. The tip is a highly stressed part of the nozzle and experiences a high rate of wear necessitating frequent replacements, especially in cases where reinforced plastic materials, i.e. those containing glass fibers, are injected. With the known nozzles such a replacement requires the changing of the entire nozzle shaft, involving a considerable expenditure of material and of labor, as the replacement of the shaft makes it necessary to dismantle the heating jacket surrounding the shaft.

SUMMARY OF THE INVENTION

It is an object of the present invention to provide a nozzle for synthetic plastic injection molding machines, whereby the flow disturbances together with the resulting changes in the material, occurring during injection with the known nozzle, are for the most part avoided. Another object of the invention is to make the simple replacement of the highly stressed part containing the tip possible. The invention comprises a shaft made of a tube segment. A small plate tapering to a point is held in the forward frontal orifice of the tube segment. The point of said plate protrudes past the tubular shaft.

The invention provides a nozzle for synthetic plastic injection molding machines, where the objects are achieved by tapering the nozzle body to a contact point. A slight deflection of the flow of the plastic material, as in the invention, serves to shorten the tear-off nipple on the injection molded part without requiring a double diversion with a complete alteration of the direction of flow and resultant negative effects on the plastic material. There is only a slight effect or none at all, on the structure of the plastic material, without an appreciable involvement of the memory capability of the plastic material, so that during the recombination of the plastic material in the mouthpiece of the nozzle extensive recrosslinking of the plastic material takes place. Consequently, a detrimental effect on the properties of the plastic material is largely prevented. According to the invention a damaged or worn-out tip can be replaced very simply without having to dismantle the shaft. It is merely necessary to remove the small plate itself from the frontal orifice of the tube segment and to replace it with a new, undamaged plate.

In an advantageous embodiment of the nozzle according to the invention the tube segment forming the body of the nozzle is turned so that an inner bore and an outer bore is cut at its frontal orifice. The inner bore serves as the seat of the small plate and the outer bore as the seat of a nozzle cap. The nozzle cap comprises the injector orifice of the nozzle and holds the small plate in a recess. It is appropriate to provide on the small plate at the transition to the tapering area a shoulder to serve as the contact surface for a corresponding shoulder formed in the nozzle cap. In this manner, fastening means that are easy to produce and which assure the secure holding of the plate are created, whereby the ready replacement desired is not affected.

BRIEF DESCRIPTION OF THE DRAWINGS

The invention is illustrated in the drawings in the form of an example. In the drawing.

DETAILED DESCRIPTION OF THE PREFERRED EMBODIMENTS

Figure 2:
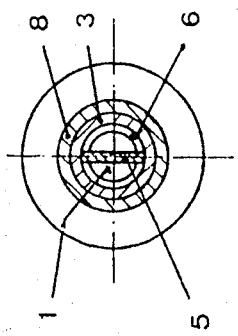
FIG. 2 shows a section on line A—A through FIG. 1.
Figure 1:
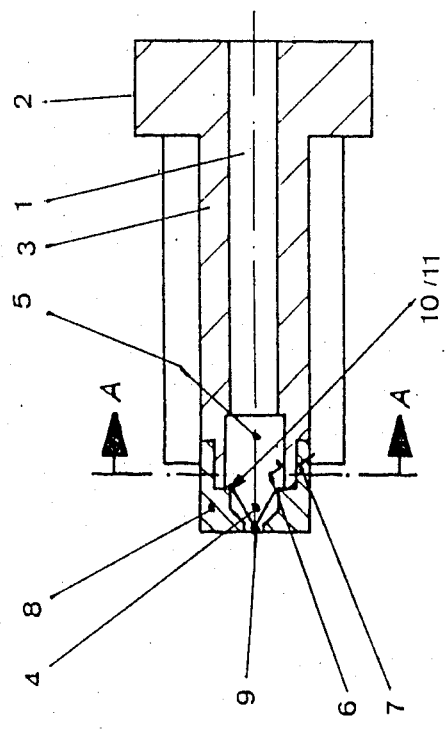
FIG. 1 shows a longitudinal section through a nozzle shaft.

The nozzle shown in the drawing for synthetic plastic injection molding machines consists essentially of a shaft containing the flow channel 1 for the plastic material equipped with a tip and designated in its entirety by 2, wherein the flow channel 1 is divided prior to reaching the tip into two partial channels. The shaft of the nozzle 2 consists of the tube segment 3, and a forward frontal orifice with a small plate 5 tapering into a point 4. The plate is held with said point 4 protruding past the shaft. The tubular segment 3 has at its frontal orifice an internal bore 6 and an external bore 7, of which the inner bore serves as the seat for the small plate 5 and the external bore 7 serves as the seat for a nozzle cap 8. The nozzle cap has an injector orifice 9 of the nozzle. The seat 6 serves to hold the small plate 5 in place. A shoulder 10 is provided on the small plate 5 at the transition to the tapering area of the point 4, the shoulder serves as the contact surface for a corresponding shoulder 11 formed in the nozzle cap and additionally may operate to secure the small plate. Any other equivalent type of holder may be used for the small plate. The invention is not limited to the particular embodiment shown and should be construed to be commensurate in scope with the claims.

What is claimed is:

1. A nozzle for synthetic plastic injection molding machines comprising:
   a shaft with a tip and flow channel for the transport of plastic material;
   said shaft having a tubular segment terminating in a frontal orifice;
   a small plate mounted in the frontal orifice dividing the flow channel into two partial channels prior to the tip, said small plate having a rectangular area and an area tapering to a frontal point from a transition point of said rectangular area, where said frontal point protrudes past the tip of the shaft; and means for holding said small plate in place comprising a nozzle cap with an injector orifice mounted on said shaft tip configured to hold said small plate in place;

said tubular segment having an internal bore and an external bore at the frontal orifice with said internal bore serving as a seat for the small plate and the external bore serving as a seat for said nozzle cap.

2. A nozzle for synthetic plastic injection molding machines as in claim 1, wherein said small plate has a shoulder at the transition point, said shoulder serving as the contact surface for a corresponding shoulder formed in the nozzle cap.

* * * * *